US011492949B2

(12) United States Patent
Bozalp et al.

(10) Patent No.: US 11,492,949 B2
(45) Date of Patent: Nov. 8, 2022

(54) EXHAUST GAS AFTERTREATMENT SYSTEM, AND METHOD FOR THE EXHAUST GAS AFTERTREATMENT OF AN INTERNAL COMBUSTION ENGINE

(71) Applicant: VOLKSWAGEN AKTIENGESELLSCHAFT, Wolfsburg (DE)

(72) Inventors: Tolga Bozalp, Berlin (DE); Stefan Paukner, Wolfsburg (DE); Falk-Christian Baron Von Ceumern-Lindenstjerna, Braunschweig (DE); Michael Kaack, Rötgesbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/428,895

(22) PCT Filed: Feb. 6, 2020

(86) PCT No.: PCT/EP2020/052937
§ 371 (c)(1),
(2) Date: Aug. 5, 2021

(87) PCT Pub. No.: WO2020/161215
PCT Pub. Date: Aug. 13, 2020

(65) Prior Publication Data
US 2022/0120202 A1 Apr. 21, 2022

(30) Foreign Application Priority Data
Feb. 6, 2019 (DE) ...................... 10 2019 102 928.7

(51) Int. Cl.
*F01N 3/30* (2006.01)
*F01N 13/00* (2010.01)
(Continued)

(52) U.S. Cl.
CPC ................. *F01N 3/30* (2013.01); *F01N 1/14* (2013.01); *F01N 3/0253* (2013.01); *F01N 3/101* (2013.01);
(Continued)

(58) Field of Classification Search
CPC ........................... F01N 3/2033; F01N 2240/14
See application file for complete search history.

(56) References Cited

U.S. PATENT DOCUMENTS

2006/0144632 A1 7/2006 Ranalli et al.
2009/0205322 A1 8/2009 Braun et al.
(Continued)

FOREIGN PATENT DOCUMENTS

CN 105041431 A 11/2015
CN 105114159 A 12/2015
(Continued)

OTHER PUBLICATIONS

Machine translation of DE-102015212514-A1, accessed Apr. 19, 2022. (Year: 2022).*
(Continued)

*Primary Examiner* — Jonathan R Matthias
(74) *Attorney, Agent, or Firm* — Pearl Cohen Zedek Latzer Baratz LLP

(57) ABSTRACT

An exhaust gas aftertreatment system for an internal combustion engine, which comprises an exhaust system which can be connected to the outlet of an internal combustion engine. A catalytic converter close to the engine and a second catalytic converter arranged downstream of the catalytic converter in an underbody of a motor vehicle are
(Continued)

provided in the flow direction of an exhaust gas from the internal combustion engine flowing through an exhaust gas duct of the exhaust system. An inlet point for secondary air, an exhaust gas burner, and a fuel injector for introducing fuel into the exhaust gas duct are arranged downstream of the catalytic converter close to the engine and upstream of the second catalytic converter. According to the invention, the exhaust gas burner is activated immediately after the internal combustion engine is started in order to heat the second catalytic converter to its light-off temperature. Once the second catalytic converter has reached its light-off temperature, secondary air and fuel are additionally introduced into the exhaust gas duct and are exothermically reacted on the second catalytic converter in order to support the heating of the second catalytic converter.

8 Claims, 6 Drawing Sheets

(51) Int. Cl.
  F01N 1/14 (2006.01)
  F01N 3/025 (2006.01)
  F01N 3/10 (2006.01)
  F01N 3/20 (2006.01)

(52) U.S. Cl.
  CPC ......... *F01N 3/2026* (2013.01); *F01N 13/009* (2014.06); *F01N 2240/14* (2013.01); *F01N 2240/16* (2013.01); *F01N 2550/14* (2013.01); *F01N 2590/11* (2013.01); *F01N 2610/03* (2013.01); *F01N 2610/1453* (2013.01)

(56) References Cited

U.S. PATENT DOCUMENTS

| | | |
|---|---|---|
| 2013/0055703 A1 | 3/2013 | Toshioka et al. |
| 2013/0327023 A1 | 12/2013 | Schlueter et al. |
| 2018/0291784 A1* | 10/2018 | Achenback ............... F01N 3/30 |
| 2019/0195115 A1 | 6/2019 | Paukner et al. |
| 2020/0116061 A1 | 4/2020 | Hupfeld et al. |

FOREIGN PATENT DOCUMENTS

| | | | |
|---|---|---|---|
| DE | 10 2006 009 934 A1 | 9/2007 | |
| DE | 10 2008 032 600 A1 | 1/2010 | |
| DE | 10 2009 003 738 A1 | 10/2010 | |
| DE | 10 2012 011 603 A1 | 12/2013 | |
| DE | 10 2012 021 573 A1 | 5/2014 | |
| DE | 102015212514 A1 * | 1/2017 | ........... F01N 13/009 |
| DE | 10 2017 113 366 A1 | 12/2018 | |
| DE | 10 2017 130 886 A1 | 6/2019 | |
| EP | 2 570 625 A1 | 3/2013 | |
| WO | WO 2004/051059 A1 | 6/2004 | |

OTHER PUBLICATIONS

Machine translation of DE-102012021573-A1, accessed Apr. 19, 2022. (Year: 2022).*
Search report for German Patent Application No. 10 2019 102 928.7, dated Jan. 23, 2020.
International Search Report of PCT Application No. PCT/EP2020/052937, dated Apr. 1, 2020.
Office Action for Chinese Patent Application No. 202080007679.0, dated Jul. 5, 2022.

* cited by examiner

EXHAUST GAS AFTERTREATMENT SYSTEM, AND METHOD FOR THE EXHAUST GAS AFTERTREATMENT OF AN INTERNAL COMBUSTION ENGINE

CROSS-REFERENCE TO RELATED APPLICATIONS

This application is a National Phase Application of PCT International Application No. PCT/EP2020/052937, International Filing Date Feb. 6, 2020, claiming priority of German Patent Application No. 10 2019 102 928.7, filed Feb. 6, 2019, which is hereby incorporated by reference.

FIELD OF THE INVENTION

The invention relates to an exhaust gas aftertreatment system and to a method for the exhaust gas aftertreatment of an internal combustion engine according to the preamble of the independent claims.

BACKGROUND OF THE INVENTION

The current exhaust gas legislation, which will become increasingly stringent in the future, places high demands on the tailpipe emissions of vehicles having internal combustion engines. The period immediately after a cold start of the internal combustion engine is of particular importance with regard to emissions, since in this phase the exhaust gas aftertreatment components should be heated to their operating temperature as quickly as possible in order to allow efficient exhaust gas aftertreatment. In the case of gasoline engines, the heating of a three-way catalytic converter (which is close to the engine) is particularly decisive for the emissions of a motor vehicle. Internal combustion engines with a secondary air system in which secondary air is introduced into the exhaust system downstream of an outlet of the internal combustion engine and upstream of the three-way catalytic converter in order to heat the three-way catalytic converter are known in the art. Furthermore, exhaust gas aftertreatment systems with an exhaust gas burner are known, in which a hot exhaust gas from the exhaust gas burner is introduced into the exhaust system in order to heat the three-way catalytic converter to its operating temperature. An exhaust gas burner can also be used to heat a three-way catalytic converter in the underbody position to its operating temperature immediately after a cold start of the internal combustion engine, since the hot burner gases can be introduced into the exhaust system at the appropriate point, thus allowing the three-way catalytic converter to be heated up substantially independently of the exhaust gas stream from the internal combustion engine.

DE 10 2008 032 600 A1 discloses a method for operating an exhaust system, in which an exhaust gas burner is arranged on the exhaust system and is operated with different combustion air ratios in order to heat a particulate filter to its regeneration temperature, and an oxidation catalytic converter is arranged downstream of an inlet point of the exhaust gas burner. The internal combustion engine is operated with an over-stoichiometric combustion air ratio and the exhaust gas burner is operated with an under-stoichiometric combustion air ratio, whereby the unburned exhaust gas components of the exhaust gas burner are exothermically reacted with the residual oxygen from the exhaust gas stream of the internal combustion engine by the oxidation catalytic converter and thus additionally heat the exhaust gas before it enters the particulate filter.

DE 10 2009 003 738 A1 discloses an exhaust gas cleaning system for an internal combustion engine, in which an exhaust gas cleaning unit is arranged in the exhaust system, which unit, in addition to the exhaust gas stream, can be heated via a second inlet by means of an exhaust gas burner. In this case, the exhaust gas burner is supplied with the fuel from the internal combustion engine by means of a fuel pump and with fresh air by means of a secondary air system, with the exhaust gas burner providing the thermal energy required to trigger or support the operation of the exhaust gas cleaning system.

In addition, DE 10 2012 011 603 A1 discloses a spark-ignition internal combustion engine with an exhaust system, in which an HC adsorber and a three-way catalytic converter downstream of the HC adsorber are arranged in the exhaust system. It is provided that a hot burner exhaust gas from an exhaust gas burner is introduced into the exhaust gas duct downstream of the HC absorber and upstream of the three-way catalytic converter in order to accelerate the heating of the three-way catalytic converter to its light-off temperature.

The disadvantage of the known solutions, however, is that large exhaust gas burners with high heating outputs are required for large, powerful internal combustion engines.

The output of the exhaust gas burner is limited by the maximum amount of fuel that can be converted based on the available installation space. Thus, the burner output cannot be increased at will, which means that a further reduction of the heating time by the exhaust gas burner is not possible.

The problem addressed by the invention is that of further accelerating the heating of a catalytic converter with a three-way function in the underbody position of a motor vehicle and thus further shortening the period of time until its light-off temperature is reached.

SUMMARY OF THE INVENTION

According to the invention, this problem is solved by an exhaust gas aftertreatment system for an internal combustion engine with an exhaust system which can be connected to an outlet of the internal combustion engine. In this case, a first catalytic converter close to the engine and a second catalytic converter downstream of the first catalytic converter close to the engine are arranged in the exhaust system in the flow direction of an exhaust gas from the internal combustion engine through an exhaust gas duct of the exhaust system. According to the invention, an exhaust gas burner is arranged downstream of the first catalytic converter and upstream of the second catalytic converter, with the aid of which burner a hot burner exhaust gas from the exhaust gas burner can be introduced into the exhaust gas duct at an inlet point downstream of the first catalytic converter. A fuel injector is arranged downstream of the inlet point for the exhaust gas burner and upstream of the second catalytic converter, with which injector fuel can be metered into the exhaust gas duct upstream of the second catalytic converter. A first catalytic converter close to the engine is to be understood in this context as a catalytic converter with a three-way function, the inlet of which has an exhaust gas run length of a maximum of 80 cm, preferably a maximum of 50 cm, from an outlet of the internal combustion engine. An exhaust gas aftertreatment system according to the invention can increase the heating output compared to an exhaust gas aftertreatment system which is heated exclusively by means of an exhaust gas burner, as a result of which faster and more efficient conversion of the gaseous pollutants in the exhaust gas stream from the internal combustion engine is possible.

The features listed in the dependent claims allow advantageous improvements and non-trivial further developments of the exhaust gas aftertreatment system specified in the independent claim.

In a preferred embodiment of the invention, downstream of the first catalytic converter close to the engine and upstream of the inlet point for the hot exhaust gas from the exhaust gas burner, a secondary air inlet point is formed in the exhaust gas duct. A secondary air system can provide the oxygen required for the exothermic reaction of the metered fuel, meaning the internal combustion engine can be operated with a stoichiometric combustion air ratio. This lowers the raw emissions and allows efficient exhaust gas aftertreatment by means of the first catalytic converter close to the engine.

In a preferred embodiment of the invention, the first catalytic converter close to the engine is designed as a three-way catalytic converter or as a four-way catalytic converter. Using a catalytic converter with a three-way function, partially oxidized exhaust gas components such as carbon monoxide, unburned hydrocarbons and hydrogen can be oxidized, and nitrogen oxides can be reduced. This allows particularly efficient exhaust gas cleaning.

In addition, the second catalytic converter is advantageously designed as a three-way catalytic converter or as a four-way catalytic converter. By means of a second catalytic converter with a three-way function, both the exhaust gas stream from the internal combustion engine and the exhaust gas from the exhaust gas burner can be aftertreated. In addition, the conversion performance can be increased in the case of high power requirements, since the first catalytic converter close to the engine and the second catalytic converter in the underbody position provide correspondingly large catalytic converter volumes. In addition, the heating measure can ensure that at least one of the catalytic converters reaches its light-off temperature and thus allows efficient conversion of pollutants.

It is particularly preferred if the second catalytic converter is designed as a lambda probe catalytic converter, with a lambda probe being arranged downstream of a first catalytic converter volume of the three-way catalytic converter and upstream of a second catalytic converter volume of the three-way catalytic converter. The first catalytic converter volume has a lower oxygen storage capacity than the second catalytic converter volume. The combination of an exhaust gas burner with a lambda probe catalytic converter makes it possible to minimize emissions during the heating phase of the three-way catalytic converter. The mixed lambda of exhaust gas from the internal combustion engine and burner exhaust gas, secondary air and metered fuel is adjusted to a stoichiometric exhaust gas with the aid of the fourth lambda probe of the lambda probe catalytic converter. The three-way catalytic converter has an oxygen storage capacity (OSC). This oxygen storage capacity means that the deviation of the lambda signal at the lambda probe of the lambda probe catalytic converter is detected with a time delay. For this reason, the lambda probe is positioned closer to the inlet of the lambda probe catalytic converter than to the outlet, so that the oxygen storage capacity of the second catalytic converter volume is greater than the oxygen storage capacity of the first catalytic converter volume. The second catalytic converter volume of the lambda probe catalytic converter can thus be used to avoid a rich breakthrough or a lean breakthrough. In addition, the function of the lambda probe catalytic converter can be diagnosed with the lambda probe without a lambda breakthrough occurring during the diagnosis.

In a further preferred embodiment of the invention, a further catalytic converter or a gasoline particulate filter is arranged downstream of the second catalytic converter. The catalytically effective volume can be further increased by means of a further catalytic converter, in particular a further three-way catalytic converter. In addition, breakthroughs through the second catalytic converter can be compensated for so that a rich or lean breakthrough through the second catalytic converter does not lead to an increase in tailpipe emissions. A particulate filter can also be used to free the exhaust gas stream of the internal combustion engine from soot particles. This may be necessary in order to meet the emission requirements of increasingly stringent exhaust gas legislation in the case of gasoline engines with high power output and/or in the case of motor vehicles which are very heavy.

In an alternative embodiment of the invention, the second catalytic converter is designed as an electrically heatable catalytic converter. Additional heating of the second catalytic converter is possible by means of an electrical heating element. As a result, the light-off temperature of the second catalytic converter can be reached even more quickly with the same burner output of the exhaust gas burner. As a result, the tailpipe emissions can be further reduced, since the time window in which the exhaust gas emissions flow through the catalytic converters without being converted is further reduced.

In an advantageous embodiment of the exhaust gas aftertreatment system, a turbine of an exhaust gas turbocharger is arranged in the exhaust gas duct downstream of the outlet of the internal combustion engine and upstream of the first catalytic converter close to the engine.

According to the invention, a method for exhaust gas aftertreatment of an internal combustion engine using an exhaust gas aftertreatment system according to the invention is proposed, which method comprises the following steps:
  starting the internal combustion engine;
  activating the exhaust gas burner, with the hot exhaust gas from the exhaust gas burner being introduced into the exhaust gas duct in order to heat the second catalytic converter to its light-off temperature, wherein
  after the light-off temperature of the second catalytic converter has been reached, fuel is additionally metered into the exhaust gas duct downstream of the inlet point of the exhaust gas burner, which fuel is exothermically reacted on the second catalytic converter in order to support the further heating of the second catalytic converter.

Using a method according to the invention, the exhaust gas aftertreatment components, in particular the second catalytic converter in the underbody layer, can be heated to their operating temperature more quickly than in the methods known from the prior art. As a result, emissions can be reduced during a cold start of the internal combustion engine.

In a further improvement of the method, secondary air is injected into the exhaust gas duct after the light-off temperature of the second catalytic converter has been reached, the metered fuel being exothermically reacted with the secondary air on the second catalytic converter in order to further heat up the second catalytic converter. By introducing secondary air, the internal combustion engine can be operated with a stoichiometric combustion air ratio during the entire heating phase. This reduces the raw emissions, in particular nitrogen oxide emission, and allows pollutants to be efficiently converted by the first catalytic converter close to the engine. This can further reduce emissions.

It is preferred in this case if both the internal combustion engine and the exhaust gas burner are operated with a stoichiometric combustion air ratio in the entire heating phase of the second catalytic converter. A stoichiometric combustion air ratio allows the exhaust gases from the internal combustion engine to be efficiently aftertreated by both catalytic converters, and allows the exhaust gases from the exhaust gas burner to be efficiently aftertreated by the second catalytic converter. This can minimize emissions in the heating phase.

In a particularly preferred improvement of the method, the amount of secondary air introduced into the exhaust gas duct and the amount of fuel metered into the exhaust gas duct are selected such that a stoichiometric exhaust gas results upstream of the second catalytic converter. This allows a particularly efficient and low-emission exothermic reaction of the metered fuel on the second catalytic converter, the second catalytic converter being heated by the exhaust gas stream from the internal combustion engine, the hot burner exhaust gases from the exhaust gas burner and the exothermic reaction on the catalytic surface of the second catalytic converter. This accelerates the heating process compared to heating methods known from the prior art.

In a preferred variant of the method, the combustion air ratio of the exhaust gas burner is controlled in a closed loop to a stoichiometric combustion air ratio via at least one lambda probe in the exhaust system until the light-off temperature of the second catalytic converter is reached. A lambda probe allows the combustion air ratio of the exhaust gas burner to be controlled in a closed loop in a particularly simple and precise manner.

It is particularly preferred here if the fuel and air amounts of the exhaust gas burner are pre-controlled after activation of the secondary air supply and the fuel metering. Since closed-loop lambda control of the exhaust gas burner is no longer possible due to the secondary air injection and the metering of fuel into the exhaust gas duct, it makes sense to pre-control the combustion air ratio of the exhaust gas burner and, in particular, to maintain the combustion air ratio from the previous heating phase.

According to the invention, a motor vehicle with a hybrid drive consisting of an internal combustion engine and an electric drive motor is proposed, wherein the internal combustion engine is connected via its outlet to an exhaust gas aftertreatment system according to the invention. In the case of a motor vehicle with a hybrid drive, the exhaust system cools down during purely electric driving. If a high power is then required and the internal combustion engine has to be switched on to meet this power requirement, it is necessary to heat up the exhaust gas aftertreatment components to their operating temperature as quickly as possible. A method according to the invention is carried out for this purpose.

Unless otherwise stated for an individual case, the various embodiments of the invention mentioned in this application can be advantageously combined with one another.

BRIEF DESCRIPTION OF THE DRAWINGS

The invention is explained below in embodiments with reference to the accompanying drawings, in which.

DETAILED DESCRIPTION OF THE INVENTION

Figure 1:
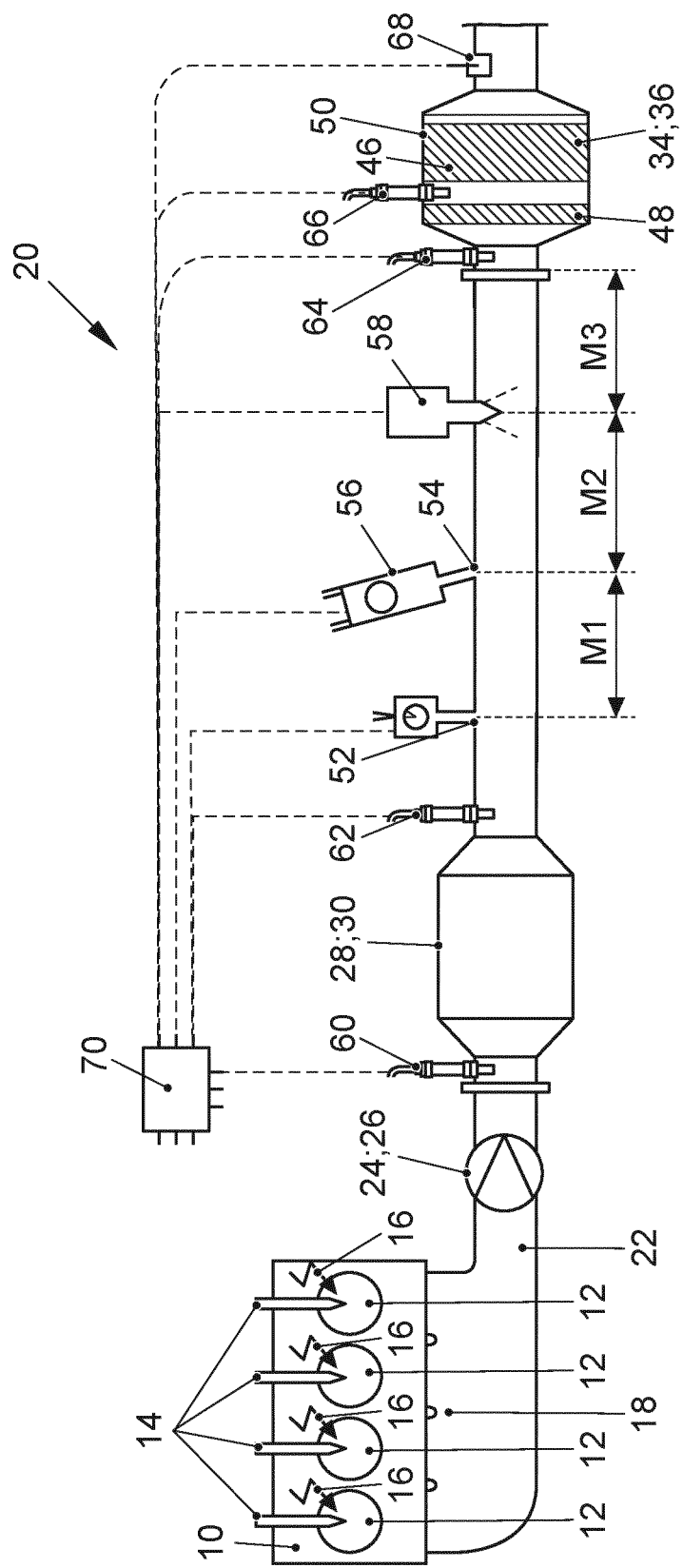
FIG. 1 shows a preferred embodiment of an exhaust gas aftertreatment system for an internal combustion engine.

FIG. 1 schematically shows an internal combustion engine 10 which comprises a plurality of combustion chambers 12 and is connected via its outlet 18 to an exhaust system 20. The internal combustion engine 10 is designed as a direct-injection gasoline engine and has a fuel injector 14 and a spark plug at each combustion chamber 12 for igniting a combustible fuel-air mixture in the combustion chambers 12. The combustion chamber 12 is delimited by a piston which is arranged so as to be linearly displaceable in a cylinder bore of the internal combustion engine 10. The piston is connected via a connecting rod to a crankshaft of the internal combustion engine 10, which transmits the power of the internal combustion engine 10 to a transmission.

The exhaust system 20 comprises an exhaust gas duct 22 in which a turbine 26 of an exhaust gas turbocharger 24 is arranged in the flow direction of an exhaust gas from the internal combustion engine 10 through the exhaust gas duct 22, which turbine drives a compressor (not shown) in the intake tract of the internal combustion engine 10 via a shaft. The exhaust gas turbocharger 24 can be designed as an exhaust gas turbocharger 24 with a variable turbine geometry. For this purpose, adjustable guide vanes via which the flow of the exhaust gas onto the blades of the turbine 26 can be varied are connected upstream of a turbine wheel of the turbine 26. Downstream of the turbine 26, a three-way catalytic converter 30 is arranged in the exhaust gas duct 22 as a first catalytic converter 28 close to the engine. Downstream of the three-way catalytic converter 30 close to the engine, a further three-way catalytic converter 36 is arranged as a second catalytic converter 34 in an underbody position of a motor vehicle. The second three-way catalytic converter 36 is designed as a lambda probe catalytic converter 46 with a first catalytic converter volume 48 and a second catalytic converter volume 50, with a lambda probe 66 being arranged downstream of the first catalytic converter volume 48 and upstream of the second catalytic converter volume 50.

A secondary air inlet point 52 is arranged downstream of the three-way catalytic converter 30 close to the engine, an inlet point 54 for an exhaust gas burner 56 is arranged downstream of the secondary air inlet point 52, and a fuel injector 58 for metering fuel into the exhaust gas duct 22 is arranged downstream of the inlet point 54 for the hot exhaust gases from the exhaust gas burner 56 and upstream of the second catalytic converter 34. A first lambda probe 60, in particular a broadband probe, is arranged downstream of the turbine 26 of the exhaust gas turbocharger 24 and upstream of the first catalytic converter 28 close to the engine. A second lambda probe 62 is arranged downstream of the first catalytic converter 28 close to the engine and upstream of the secondary air inlet point 52. A third lambda probe 64 can be arranged at the inlet of the second catalytic converter 34. Furthermore, a temperature sensor 68 can be arranged in the exhaust gas duct 22 in order to detect an exhaust gas temperature. In addition, further exhaust gas sensors are possible in order to measure the concentration of individual pollutants in the exhaust gas and to check the function of the catalytic converters. The lambda probes 60, 62, 64, 66 are connected via signal lines to an engine control unit 70 of the internal combustion engine 10, via which the injection amount and the ignition timing in the combustion chambers are also controlled.

Figure 2:
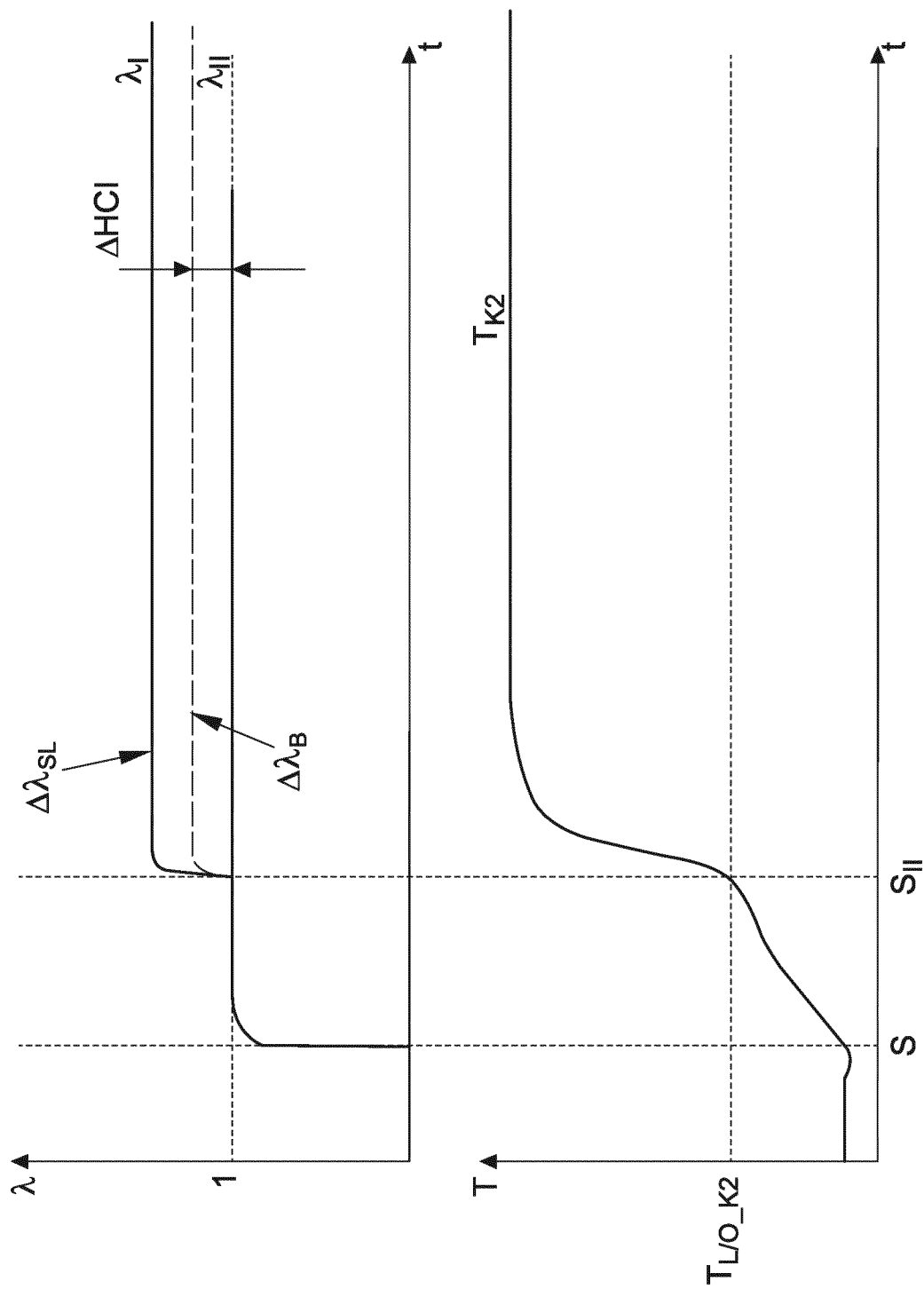
FIG. 2 shows diagrams showing the curve of the combustion air ratios and of the temperature of the second three-way catalytic converter in the underbody position when carrying out a method according to the invention for exhaust gas aftertreatment.

Downstream of the secondary air inlet point 52, a first mixing section M1 is formed in which the secondary air mixes with the exhaust gas stream from the internal combustion engine 10. Downstream of the inlet point 54 of the exhaust gas burner 56, a second mixing section M2 is formed in which the hot burner exhaust gas mixes with the exhaust gas stream from the internal combustion engine 10. Downstream of the fuel injector 58, up to the inlet of the second catalytic converter 34, a third mixing section M3 is formed in which the metered fuel evaporates and mixes with the exhaust gas stream from the internal combustion engine 10. The method according to the invention for exhaust gas aftertreatment aims to increase the heating power for the second catalytic converter 34 compared to the heating measures known from the prior art, in particular heating the exhaust gas flow solely via the exhaust gas burner 56 during stoichiometric operation of the internal combustion engine 10. With the aid of the exhaust gas burner 56, the second catalytic converter 34, as shown in FIG. 2, is heated to its light-off temperature $T_{L/O\ K2}$ promptly after a cold start S of the internal combustion engine 10. After the light-off temperature $T_{L/O\ K2}$ of the second catalytic converter 34 has been reached, both the introduction of secondary air via the secondary air inlet point 52 and the fuel injection into the exhaust gas duct 22 by means of the fuel injector 58 are activated at a time $S_{II}$. The excess oxygen from the secondary air reacts exothermically with the fuel on the heated, catalytically effective surface of the second catalytic converter 34 and heats it in addition. The internal combustion engine 10 and the exhaust gas burner 54 are always operated with a stoichiometric combustion air ratio. The metering of the secondary air and the fuel injected into the exhaust duct is controlled in an open or closed loop in such a way that a stoichiometric exhaust gas results before the exhaust gas stream enters the second catalytic converter 34. The exhaust gas air ratio changes downstream of the secondary air inlet point so that an over-stoichiometric exhaust gas $\lambda_I$ is present in the first mixing section M1. As a result of the introduction of the hot, stoichiometric burner exhaust gas, the exhaust gas lambda $\lambda_{II}$ in the second mixing section M2 decreases, but remains above over-stoichiometric. By metering in the fuel, a stoichiometric exhaust gas is achieved in the third mixing section M3.

The introduction of secondary air and the simultaneous metering of fuel into the exhaust gas duct have the effect of a virtual enlargement of the combustion chamber of the exhaust gas burner. As a result, fewer particle emissions and a higher overall efficiency are achieved. More rapid heating of the second catalytic converter 34 in the underbody position of a motor vehicle 86 due to a larger mass flow is also advantageous. This ensures that a larger volume of the second catalytic converter 34 is heated through. This is particularly important for drive concepts with high engine power. If such a motor vehicle 86 is rapidly accelerated shortly after the internal combustion engine 10 has been started S, a high active catalytic converter volume is required to avoid an emissions slip. Such a method is also of particular interest for a motor vehicle 86 shown schematically in FIG. 9 with a hybrid drive 80 consisting of an electric drive motor 86 and an internal combustion engine 10, if the internal combustion engine 10 is started with a high load requirement.

According to the method according to the invention, when there is a requirement to heat the second catalytic converter 34, the exhaust gas burner 56 preheats the second catalytic converter 34 when the engine is started S, and this preheating time is simultaneously used to adapt the closed-loop lambda control of the exhaust gas burner 56, since in this method step there is no further influence on the exhaust gas air ratio by the secondary air injection or the fuel metering. Both the internal combustion engine 10 and the exhaust gas burner 56 are adjusted to a stoichiometric combustion air ratio, with the corresponding lambda probes 60, 64, 66 upstream of the first catalytic converter 28 close to the engine and downstream of the inlet point 54 of the burner exhaust gases, until the light-off temperature $T_{L/O\ K2}$ of the second catalytic converter 34 has been reached. When the light-off temperature $T_{L/O\ K2}$ of the second catalytic converter 34 has been reached, in particular a temperature between 300° C. and 400° C., particularly preferably between 340° C. and 360° C., the secondary air injection and the fuel metering is activated and the exhaust gas burner 56 is controlled only in an open loop and no longer in a closed loop, since the secondary air injection and the fuel metering prevents closed-loop lambda control of the exhaust gas burner 56. The secondary air injection results in a lean exhaust gas upstream of the inlet point 54 of the exhaust gas burner 56 by mixing with the exhaust gas stream from the internal combustion engine 10. As a result of the stoichiometric burner exhaust gas, the exhaust gas air ratio downstream of the inlet point 54 is shifted toward rich by the inflowing burner exhaust gas, but remains in the over-stoichiometric range. By metering the fuel into the lean exhaust gas, a mixture preparation takes place which generates a stoichiometric exhaust gas stream. Thus, once the light-off temperature $T_{L/O\ K2}$ of the second catalytic converter 34 has been reached, the closed-loop lambda control of the mixed exhaust gas takes place by means of the third or fourth lambda probe 64, 66 immediately upstream of the second catalytic converter 34 or in the second catalytic converter 34.

Alternatively, the method can be used to heat a gasoline particulate filter or a four-way catalytic converter in the underbody position of a motor vehicle to its regeneration temperature. The method is ended and the exhaust gas burner 56 is thus switched off, and the introduction of secondary air and the metering of fuel are stopped when the second catalytic converter 34 has reached a target temperature.

Figure 3:
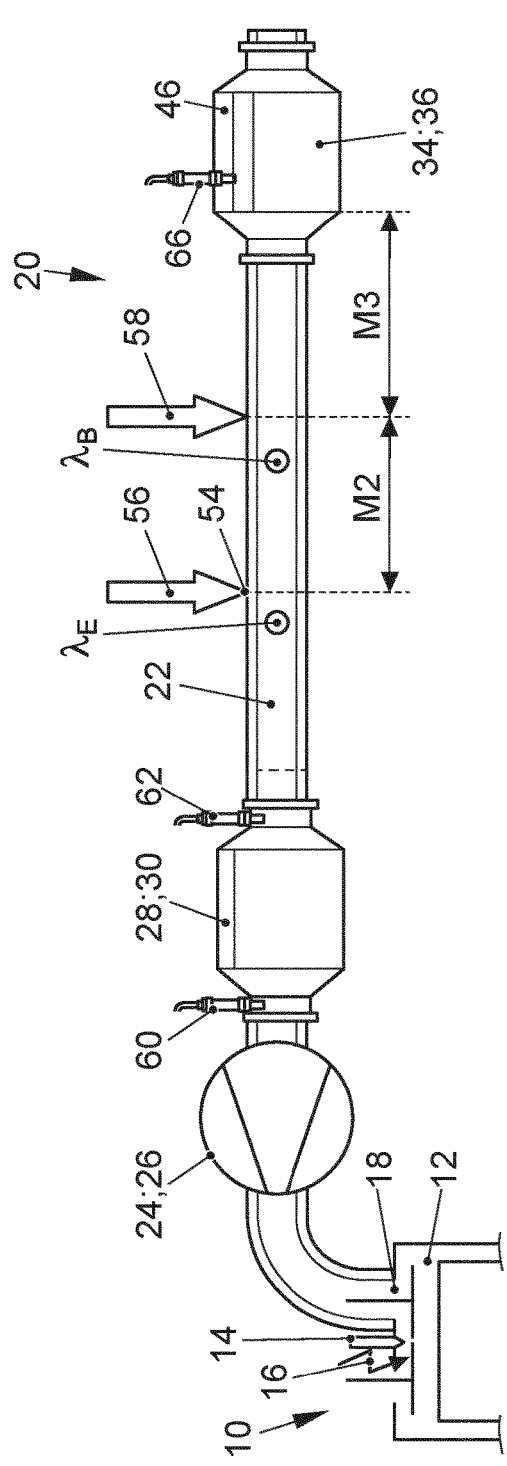
FIG. 3 shows a further embodiment of an exhaust gas aftertreatment system for an internal combustion engine, in which the secondary air inlet point downstream of the first catalytic converter and the lambda probe upstream of the second catalytic converter are omitted.

FIG. 3 shows an alternative embodiment of an exhaust gas aftertreatment system according to the invention. With essentially the same structure as explained in connection with FIG. 1, only the differences will be discussed below. A secondary air system is dispensed with in this embodiment. In this case, the internal combustion engine 10 is operated with an over-stoichiometric combustion air ratio once the light-off temperature $T_{L/O\ K2}$ of the second catalytic converter 34 has been reached, and a stoichiometric exhaust gas is achieved by the metering of fuel via the fuel injector 58 before entry into the second catalytic converter 34.

Figure 4:
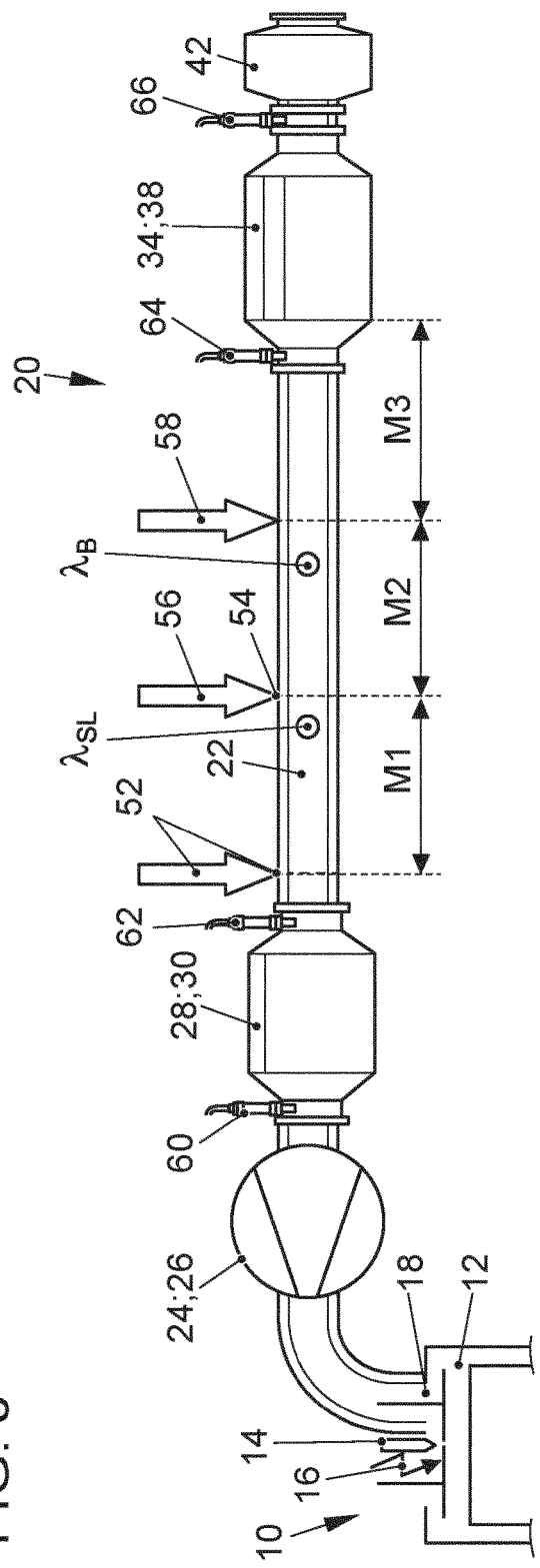
FIG. 4 shows an alternative embodiment of an exhaust gas aftertreatment system for a spark-ignition internal combustion engine, in which the second catalytic converter is designed as a four-way catalytic converter and a further three-way catalytic converter is connected downstream of the four-way catalytic converter.

FIG. 4 shows a further alternative embodiment of an exhaust gas aftertreatment system according to the invention. With essentially the same structure as described in connection with FIG. 1, the second catalytic converter 34 is designed as a four-way catalytic converter 38 in this embodiment. A further three-way catalytic converter is arranged as a third catalytic converter 42 downstream of the four-way catalytic converter 38. The fourth lambda probe 66 is arranged downstream of the four-way catalytic converter 38 and upstream of the third catalytic converter 42. A simple on-board diagnosis of the four-way catalytic converter 38 can thus be carried out. The third catalytic converter 38 downstream of the four-way catalytic converter 42 and the fourth lambda probe 66 provides further protection in order to be able to check the fourth lambda probe 66 as part of an on-board diagnosis and to avoid an increase in the tailpipe emissions when such a diagnosis is carried out.

Figure 5:
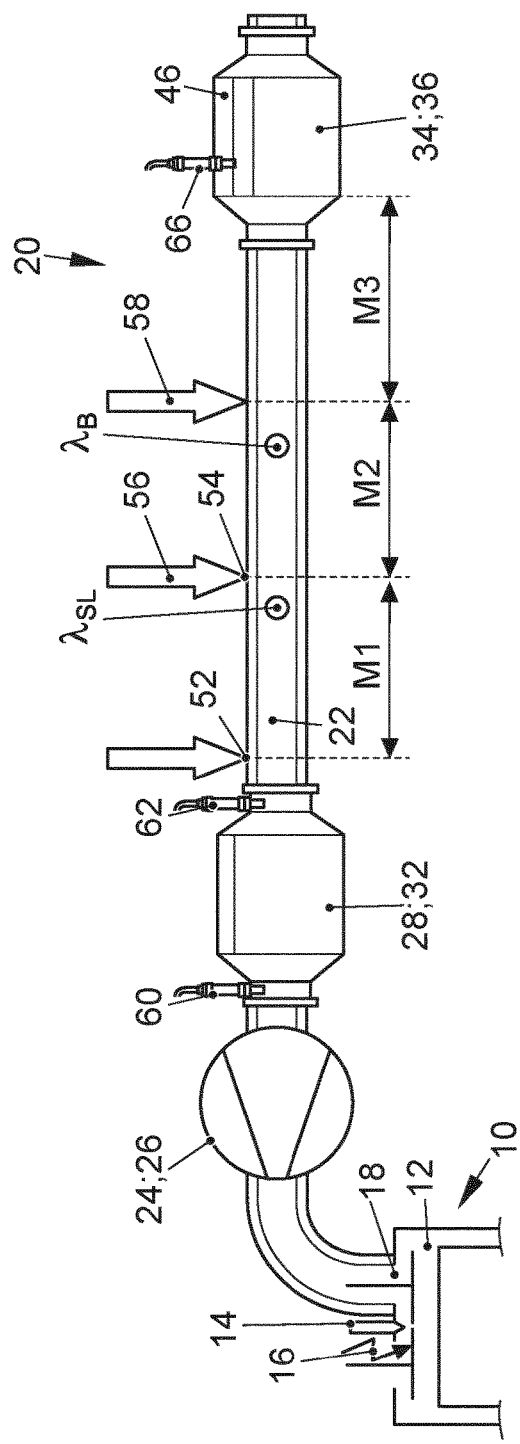
FIG. 5 shows a further alternative embodiment of an exhaust gas aftertreatment system, in which the first catalytic converter is designed as a four-way catalytic converter.

FIG. 5 shows a further alternative embodiment of an exhaust gas aftertreatment system according to the invention. With essentially the same structure as explained in connection with FIG. 1, in this embodiment the first catalytic converter 28 close to the engine is designed as a four-way catalytic converter 32. The third lambda probe 64 can be omitted. The four-way catalytic converter allows the exhaust gas stream to additionally be cleaned of soot particles.

Figure 6:
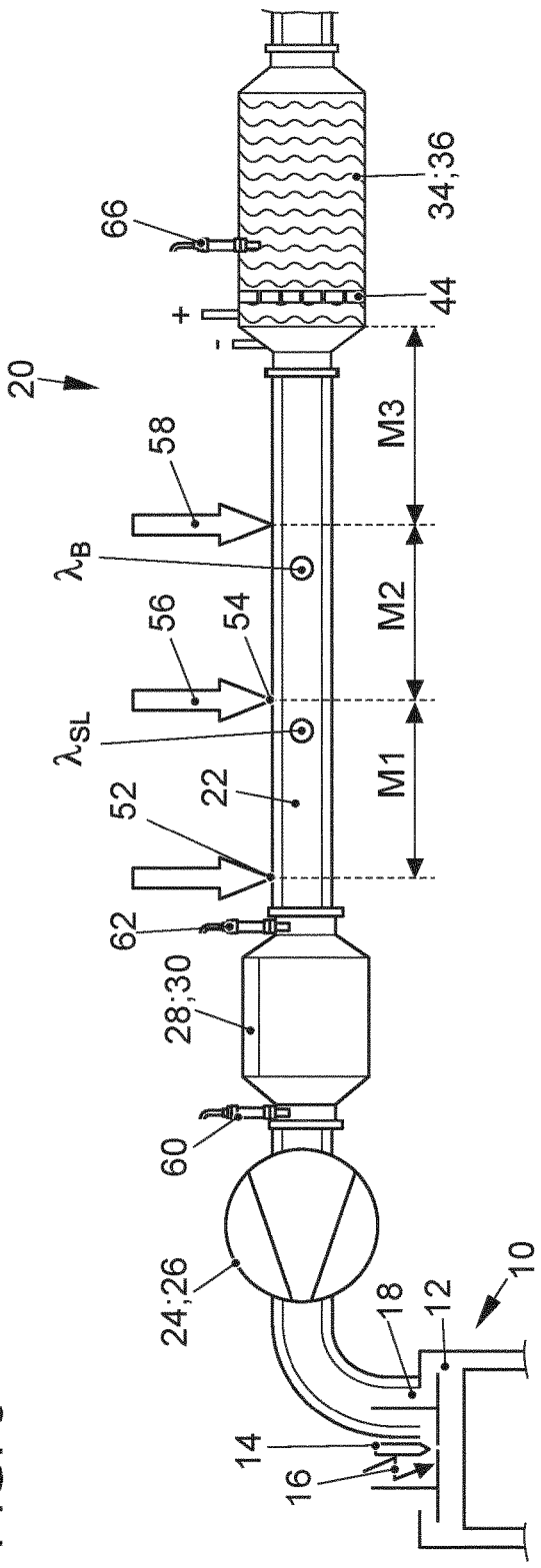
FIG. 6 shows a further embodiment of an exhaust gas aftertreatment system according to the invention, in which the second catalytic converter is designed as an electrically heatable catalytic converter.

FIG. 6 shows a further embodiment for an exhaust gas aftertreatment system according to the invention. The second catalytic converter 34 in the underbody position is designed as an electrically heatable three-way catalytic converter 36, 44. An electrically heatable second catalytic converter offers the advantage that the time until the light-off temperature is reached can be shortened further with the same burner output of the exhaust gas burner 56 and additional heating energy can be introduced into the second catalytic converter 34 by the electrical heating.

Figure 7:
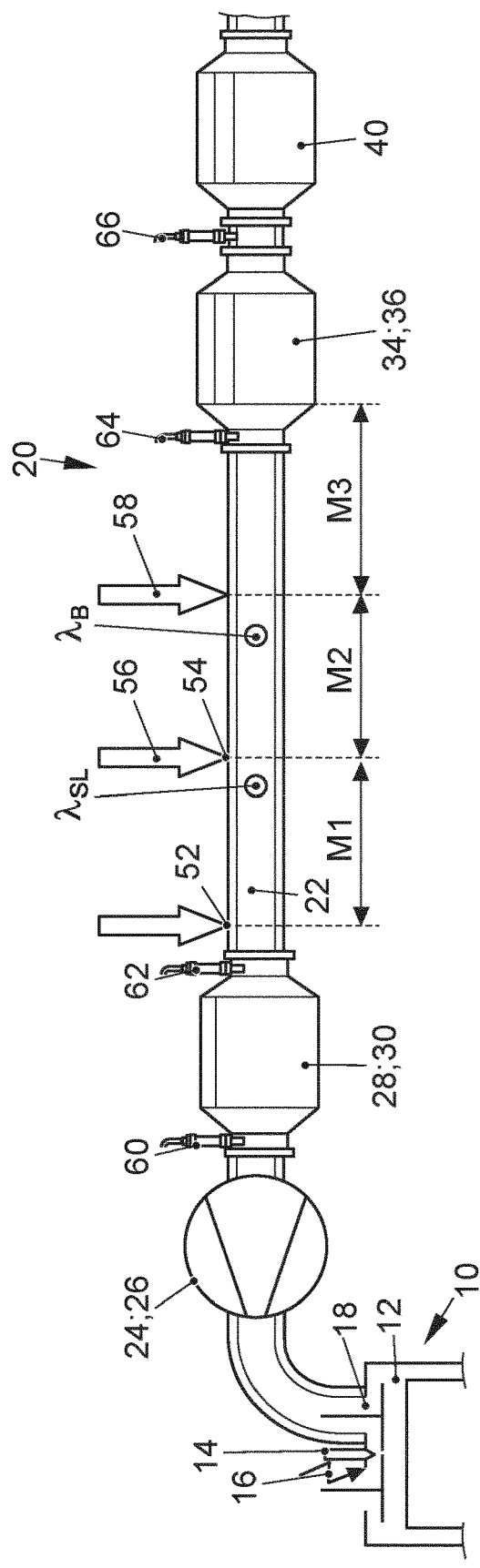
FIG. 7 shows a further embodiment of an exhaust gas aftertreatment system according to the invention, in which a gasoline particulate filter is connected downstream of the second catalytic converter.

FIG. 7 shows a further embodiment of an exhaust gas aftertreatment system according to the invention. With essentially the same structure as in FIG. 1, a further three-way catalytic converter 42 is arranged downstream of the second three-way catalytic converter 34, 36 in this embodiment. Furthermore, the fourth lambda probe 66 is arranged downstream of the second three-way catalytic converter 34, 36 and upstream of the third catalytic converter 42. By means of a further three-way catalytic converter 42, the total available catalytic converter volume can be increased and protection against breakthroughs through the second catalytic converter 34 can be provided. In addition, it is possible to dispense with designing the second catalytic converter 34 as a lambda probe catalytic converter.

Figure 8:
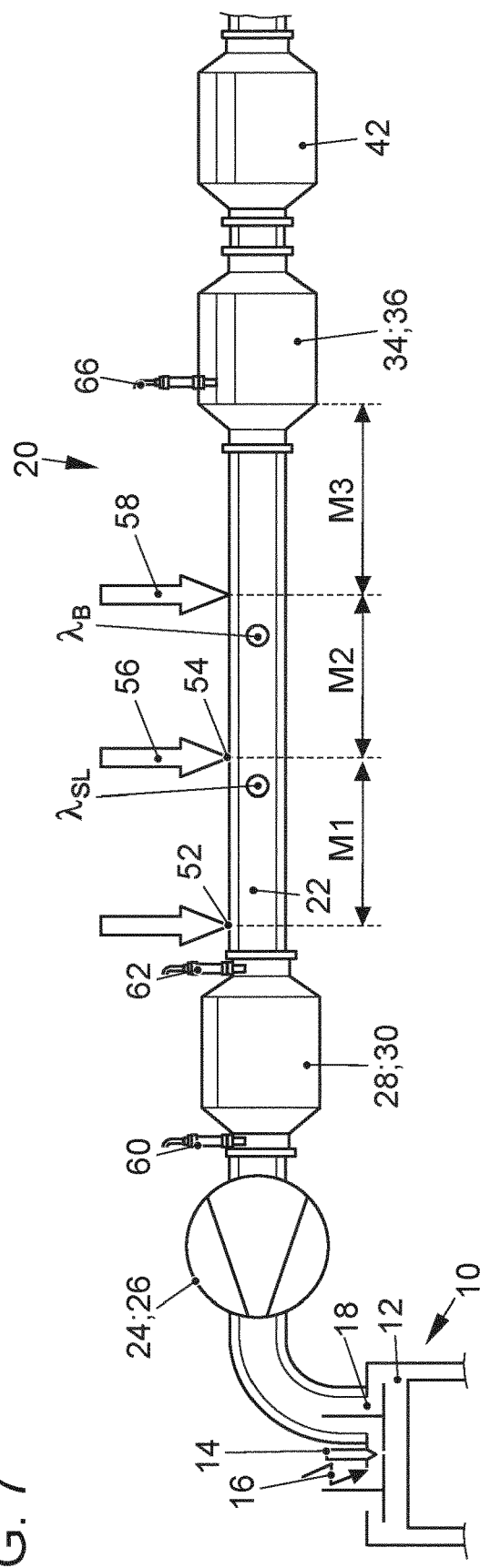
FIG. 8 shows a further embodiment of an exhaust gas aftertreatment system according to the invention, in which a further three-way catalytic converter is connected downstream of the second catalytic converter.

FIG. 8 shows a further embodiment of an exhaust gas aftertreatment system according to the invention. With essentially the same structure as shown in FIG. 1, in this embodiment a preferably uncoated gasoline particulate filter 40 is arranged in the exhaust gas duct 22 downstream of the second catalytic converter 34, which is designed as a three-way catalytic converter 36. The gasoline particulate filter 40 can additionally filter out soot particles from the exhaust gas stream of the internal combustion engine 10.

Figure 9:
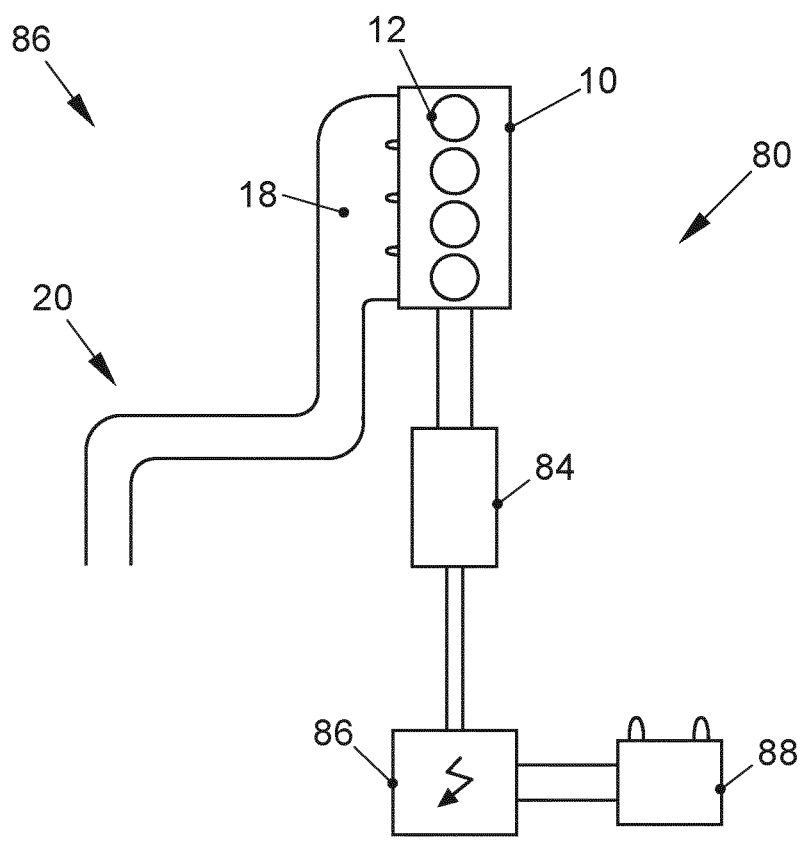
FIG. 9 schematically shows a motor vehicle with a hybrid drive, the hybrid drive having an electric drive motor and an internal combustion engine, and the internal combustion engine being connected to an exhaust gas aftertreatment system according to the invention.

FIG. 9 schematically shows the structure of a motor vehicle 86 with a hybrid drive 80 consisting of an electric drive motor 82 and an internal combustion engine 10. The electric drive motor 86 is connected to a battery 88, which supplies the electric drive motor 86 with power. The electric drive motor 86 and the internal combustion engine 10 are connected to a common transmission 84 which transmits the drive torque to the wheels of the motor vehicle 86. The internal combustion engine 10 is connected via its outlet 18 to an exhaust gas aftertreatment system according to the invention. If a high power is required in a hybrid drive 80 and the internal combustion engine 10 has to be switched on to meet this power requirement, rapid heating of the exhaust system of the internal combustion engine 10 is particularly important in order to avoid emissions. The proposed exhaust gas aftertreatment system is therefore particularly advantageous in the case of a hybrid drive 80 in order to be able to react appropriately to the switching on of the internal combustion engine when the exhaust system 20 is cold and to minimize emissions.

LIST OF REFERENCE SIGNS

10 Internal combustion engine
12 Combustion chamber
14 Fuel injector
16 Spark plug
18 Outlet
20 Exhaust system
22 Exhaust gas duct
24 Exhaust gas turbocharger
26 Turbine
28 First catalytic converter close to the engine
30 Three-way catalytic converter
32 Four-way catalytic converter
34 Second catalytic converter
36 Three-way catalytic converter
38 Four-way catalytic converter
40 Gasoline particulate filter
42 Third catalytic converter
44 Electrically heatable catalytic converter
46 Lambda probe catalytic converter
48 First catalytic converter volume
50 Second catalytic converter volume
52 Secondary air inlet point
54 Inlet point for burner exhaust gas
56 Exhaust gas burner
58 Fuel injector
60 First lambda probe
62 Second lambda probe
64 Third lambda probe
66 Fourth lambda probe
68 Temperature sensor
70 Engine control unit
80 Hybrid drive
82 Electric drive motor
84 Transmission
86 Motor vehicle
88 Battery
M1 First mixing section M2 Second mixing section
M3 Third mixing section
S Starting the internal combustion engine
$S_{II}$ Starting the secondary air injection and HC metering
T Temperature
$T_{K2}$ Temperature of the second catalytic converter
$T_{L/O\_K2}$ Light-off temperature of the second catalytic converter
t Time
$\lambda$ Combustion air ratio
$\lambda_B$ Combustion air ratio of the exhaust gas burner
$\lambda_E$ Combustion air ratio of the internal combustion engine
$\lambda_I$ Exhaust gas air ratio before the inlet point of the exhaust gas burner
$\lambda_{II}$ Exhaust gas air ratio after the inlet point of the exhaust gas burner
$\Delta\lambda_{SL}$ Change in the exhaust gas air ratio due to the secondary air injection
$\Delta\lambda_B$ Change in the exhaust gas air ratio due to the burner exhaust gas
$\Delta HCl$ Change in the exhaust gas air ratio due to the fuel metering

The invention claimed is:

1. An exhaust gas aftertreatment system for an internal combustion engine, comprising:
    an exhaust system which can be connected to an outlet of the internal combustion engine,
    a first catalytic converter close to the engine and a second catalytic converter downstream of the first catalytic converter close to the engine being arranged in the exhaust system in the flow direction of an exhaust gas from the internal combustion engine through an exhaust gas duct of the exhaust system,
    an inlet point for the hot exhaust gas from an exhaust gas burner formed downstream of the first catalytic converter and upstream of the second catalytic converter,
    a fuel injector for metering fuel into the exhaust gas duct arranged downstream of the first inlet point and upstream of the second catalytic converter, and
    a secondary air inlet point into the exhaust gas duct formed downstream of the first catalytic converter close to the engine and upstream of the inlet point for the hot exhaust gas from the exhaust gas burner.

2. The exhaust gas aftertreatment system according to claim 1, wherein the first catalytic converter close to the engine is designed as a three-way catalytic converter or as a four-way catalytic converter.

3. The exhaust gas aftertreatment system according to claim 1, wherein the second catalytic converter is designed as a three-way catalytic converter or as a four-way catalytic converter.

4. The exhaust gas aftertreatment system according to claim 3, wherein the second catalytic converter is designed as a lambda probe catalytic converter.

5. The exhaust gas aftertreatment system according to claim 1, further comprising a further catalytic converter or a gasoline particulate filter arranged downstream of the second catalytic converter.

6. The exhaust gas aftertreatment system according to claim 1, wherein the second catalytic converter is designed as an electrically heatable catalytic converter.

7. The exhaust gas aftertreatment system according to claim 1, further comprising a turbine of an exhaust gas turbocharger arranged in the exhaust gas duct downstream of the outlet of the internal combustion engine and upstream of the first catalytic converter close to the engine.

8. A Motor vehicle with a hybrid drive consisting of an internal combustion engine and an electric drive motor, the internal combustion engine being connected via its outlet to an exhaust gas aftertreatment system according to claim 1.

* * * * *